(12) United States Patent
Wern

(10) Patent No.: US 9,248,546 B1
(45) Date of Patent: Feb. 2, 2016

(54) IDLER ASSEMBLY FOR PART PROCESSING

(71) Applicant: ENGINEERED ABRASIVES, INC., Alsip, IL (US)

(72) Inventor: Michael J. Wern, Alsip, IL (US)

(73) Assignee: ENGINEERED ABRASIVES, INC., Alsip, IL (US)

( * ) Notice: Subject to any disclaimer, the term of this patent is extended or adjusted under 35 U.S.C. 154(b) by 0 days.

(21) Appl. No.: 14/498,528

(22) Filed: Sep. 26, 2014

(51) Int. Cl.
| | |
|---|---|
| *B24C 3/00* | (2006.01) |
| *B24C 3/20* | (2006.01) |
| *B23Q 39/04* | (2006.01) |
| *B23Q 11/08* | (2006.01) |
| *F16H 55/36* | (2006.01) |
| *B65G 29/00* | (2006.01) |
| *B65G 45/14* | (2006.01) |

(52) U.S. Cl.
CPC .............. *B24C 3/20* (2013.01); *B23Q 11/0883* (2013.01); *B23Q 39/042* (2013.01); *B65G 29/00* (2013.01); *B65G 45/14* (2013.01); *F16H 55/36* (2013.01)

(58) Field of Classification Search
CPC ........... B23Q 2039/006; B23Q 39/042; B23Q 11/0883; B24C 3/20
See application file for complete search history.

(56) References Cited

U.S. PATENT DOCUMENTS

| | | | | | |
|---|---|---|---|---|---|
| 2,365,152 | A | * | 12/1944 | Stearman .................. | B24C 3/20 451/84 |
| 2,719,387 | A | * | 10/1955 | Fahrney ..................... | B24C 3/20 451/102 |
| 3,793,707 | A | * | 2/1974 | Foll .......................... | B23B 11/00 29/33 J |
| 4,614,018 | A | * | 9/1986 | Krall ........................ | B23Q 7/005 264/536 |
| 4,917,708 | A | * | 4/1990 | Yamaguchi ............... | B23Q 7/02 451/102 |
| 5,201,249 | A | * | 4/1993 | Sterenberg ................ | B23Q 1/52 108/139 |
| 5,272,897 | A | * | 12/1993 | Wern .................... | B23Q 39/042 269/254 CS |
| 7,160,172 | B2 | * | 1/2007 | Frost ...................... | B24B 19/028 15/77 |
| 2014/0360241 | A1 | * | 12/2014 | Yamamoto ............... | B24C 3/24 72/53 |

* cited by examiner

*Primary Examiner* — Gene Crawford
*Assistant Examiner* — Thomas Randazzo
(74) *Attorney, Agent, or Firm* — Barnes & Thornburg LLP

(57) ABSTRACT

The present disclosure includes a belt-and-pulley system for a part processing assembly. The part is retained on a spindle assembly of the belt-and-pulley system, and rotation of the spindle assembly is driven by a drive belt of the belt-and-pulley system that travels along a belt path. The belt-and-pulley system includes one or more idler assemblies that permit continuous rotation of the drive belt regardless of whether a part is being processed. As a part is processed, processing material, such as peening material, may be introduced near the belt-and-pulley system and may unintentionally interfere with operation of the belt-and-pulley system. The idler assembly of the belt-and-pulley system includes a vane sweep that is configured to block or prevent introduction of the processing material into the rotational operation of a circular pulley of the idler assembly. The vane sweep includes a top ledge that prevents introduction of peening material into a rotational aperture of the circular pulley and one or more fins that are configured to sweep or brush accumulated processing material away from the circular pulley. The vane sweep further includes an annular sheath that extends away from the circular pulley and surrounds a supporting member that supports or maintains the circular pulley, the annular sheath configured to further prevent processing material from interfering with rotational operation of the circular pulley. The location of the idler assemblies within the belt-and-pulley system may be determined to optimize the number of spindle assemblies that can be used to process parts simultaneously in the part processing assembly.

23 Claims, 9 Drawing Sheets

PRIOR ART

IDLER ASSEMBLY FOR PART PROCESSING

BACKGROUND

The subject matter disclosed herein relates to an idler assembly, and more particularly, an idler assembly for a part processing apparatus. More particularly, the present invention includes a system and apparatus of an idler assembly for a belt-and-pulley system used to rotate or otherwise move retained parts in an automatic apparatus for processing parts. The part processing apparatus is similar to the device as shown in U.S. Pat. No. 5,272,897, which is hereby incorporated by reference.

During a shot peening or media blasting operation, for example, peening media is shot, sprayed, or otherwise projected toward a part being processed. A peening process is used to provide various advantages to a part, such as, but not limited to, increasing the fatigue strength. For example, gears, such as those utilized in automobile transmissions, are peened to increase their surface durability and ensure that they are suitable for performing their intended functions. The force and direction of the peening material is configured to engage with the surface of the part being processed to controllably alter the surface of the part. The peening media may be of various types of material or various sizes, depending on the intended resulting character or characteristics, such as, but not limited to, physical features, such as texture, look or physical performance, of the part surface. During a peening operation, a work piece or part is placed in a closed chamber and the blasting is actuated, whereby the media is mixed with air and a stream of the air and media mixture is directed against the surface of the work piece or part.

A processing apparatus as shown in U.S. Pat. No. 5,272,897 uses a shaft-and-spindle assembly to hold up parts or work pieces in the apparatus as processing occurs to the parts. The shaft-and-spindle assembly is configured to provide for rotational movement of the parts within the processing apparatus in order to permit effective processing (e.g. peening) of the entire circumference of the part. Specifically, the processing apparatus may be configured with one or more belt-and-pulley systems, for example, that are used to drive rotational movement of the shaft and spindle assembly holding a part being processed.

The belt-and-pulley system of a part processing apparatus may include one or more idler assemblies that are configured to direct movement of a drive belt of the belt-and-pulley system and/or permit adjustments to the belt-and-pulley system. For instance, the belt may be adjusted for directional change, length adjustment, tension adjustment, vibration dampening, and/or belt replacement. In a part processing apparatus, an idler assembly is preferably configured not to include a shaft to hold a part being processed. Instead, an idler assembly may be configured to continually rotate even when a shaft-and-spindle assembly holding a part is not rotated. Thus, the idler assembly permits the belt-and-pulley system to continue to run even when a part is not being processed in the processing apparatus, thereby reducing the time, energy, and resources needed to start and stop the processing apparatus. The idler assembly also helps regulate how the belt runs, for example from a crankshaft, in order to generate movement in other components, such as the shaft and spindle assembly.

As processing occurs to a part in a processing apparatus, peening media or material may be sprayed or blasted throughout the processing apparatus. Such spraying may result in the accumulation of peening material around or near the belt-and-pulley system, or more specifically, the idler assembly. As peening material accumulates, the peening material may unintentionally interfere with the rotational operation of the belt-and-pulley system, and more specifically, the idler assembly. For example, such peening material may get lodged or stuck near the rotation point of the idler assembly, for example between a shaft of the idler assembly and a bearing assembly of a pulley head of the idler assembly when the pulley head is configured to rotate above the shaft of the idler assembly with movement of a belt guided by the pulley head. Such lodged peening media may therefore clog the idler assembly, interfering with the continuous repetitive rotation of the idler assembly. Because of this issue, prior-art systems employ various techniques to determine whether rotation of an idler assembly or a belt-and-pulley system unintentionally ceases. Such monitoring includes expensive or intricate sensors or monitoring devices that monitor rotation of the idler assembly or belt-and-pulley system. Once an interruption of rotation is detected, the belt-and-pulley system is removed in order to clear and clean the peening media from the idler assembly. Such removal requires the peening machine to be taken off line, resulting in substantial down time and resources to resolve a jammed or clogged idler assembly. The present invention is an improvement on the prior art with these potential issues.

Moreover, processing of multiple parts within the processing apparatus may be limited by the number of shaft-and-spindle assemblies that are located along the belt-and-pulley system. The present invention is directed to idler assemblies provided in various relationships to the spindle assemblies to optimize or maximize the number of spindle assemblies that can simultaneously be rotated with a single drive belt.

This background information provides some information believed by the applicant to be of possible relevance to the present disclosure. No admission is intended, nor should such admission be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

The present disclosure provides for a vane sweep positioned below and adjacent to the pulley of the idler assembly. In an exemplary embodiment, the vane sweep is configured to rotate with the rotation of the idler assembly and is fixedly connected to a bottom guide of the pulley head. The vane sweep includes one or more fins or sweep arms that are configured to sweep away peening media from the shaft and pulley of the idler assembly. A top ledge of the vane sweep is fixedly connected to the bottom guide of the pulley head to prevent introduction of peening material into a rotational aperture in the center of the pulley through which the shaft extends and the pulley rotates about. The combination of the sweep fins and top ledge effectively prevent any peening media from entering or clogging the rotational aperture of the pulley.

These and other advantages and features will become more apparent from the following description taken in conjunction with the drawings.

BRIEF DESCRIPTION OF THE DRAWINGS

The present disclosure will be described hereafter with reference to the attached drawings which are given as a non-limiting example only, in which.

Figure 1:
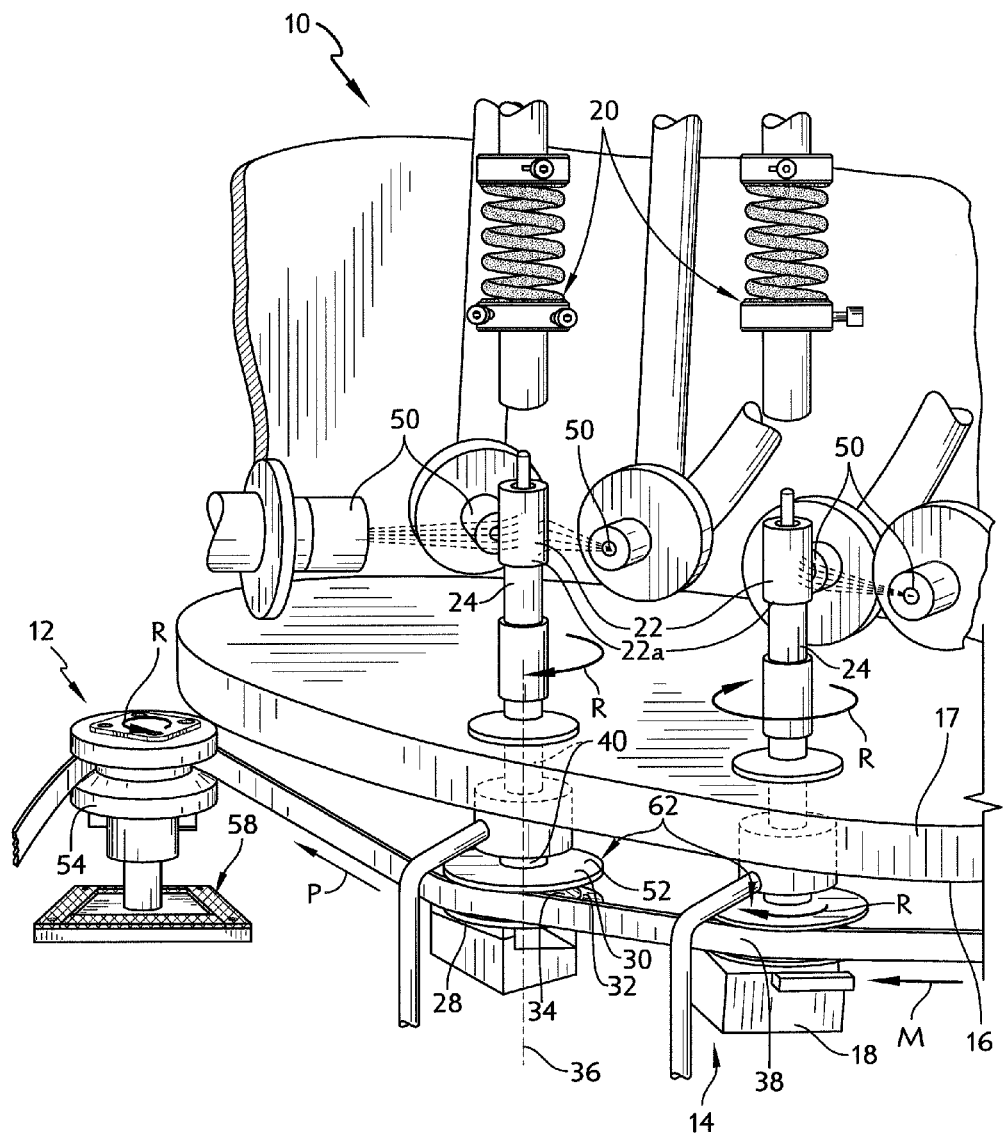
FIG. 1 is a perspective view of an automatic part processing apparatus for processing a part by a method such as peening, with a portion of the apparatus broken away to reveal a turntable and a set of lower spindle assemblies retaining parts to be processed and an idler assembly.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figure 2:
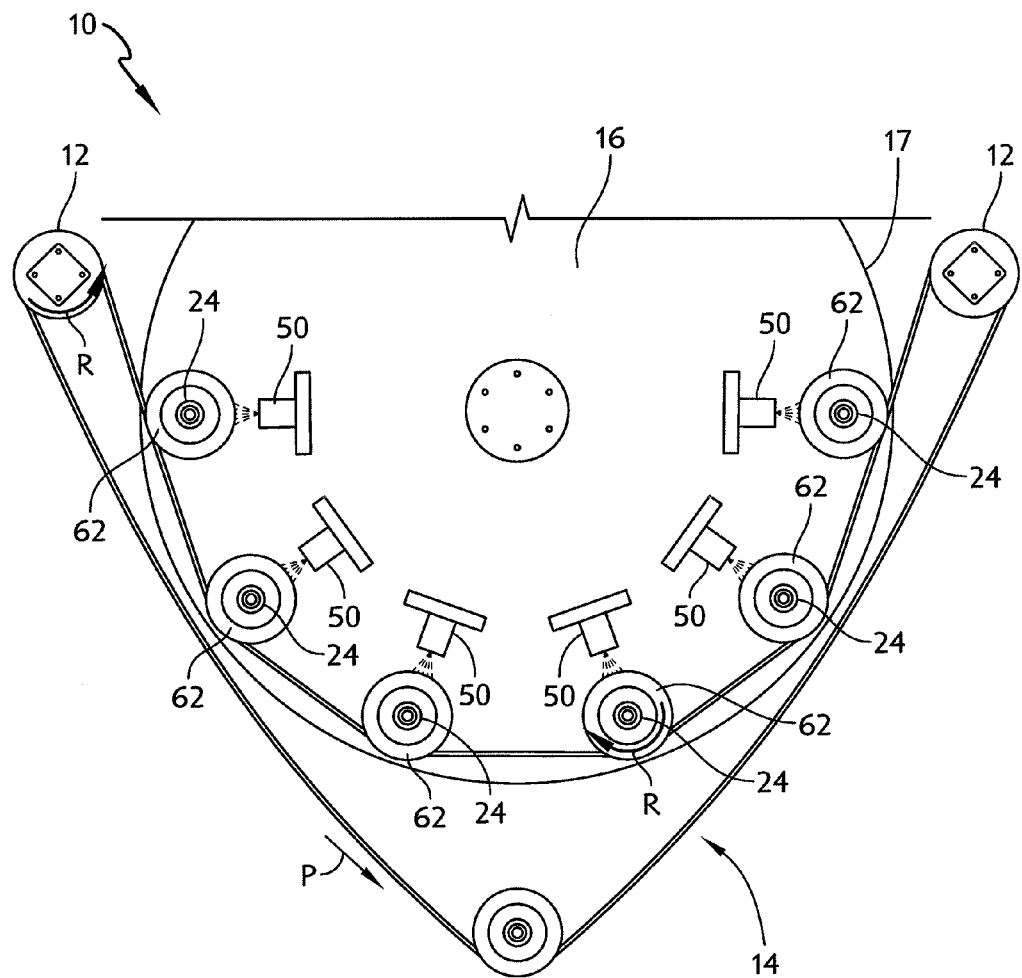
FIG. 2 is a top perspective view of the automatic part processing apparatus of FIG. 1A and showing a closed-loop belt track for the part processing apparatus.

As shown in FIGS. 1 and 2, a processing assembly 10 of a larger parts-processing apparatus is shown. The overall parts processing apparatus is similar to that as shown and described in U.S. Pat. No. 5,272,897, incorporated by reference herein. While the basic operation of this part processing assembly 10 will be described hereinbelow, the primary focus of the present application will be on the structures and functions associated with a belt-and-pulley system 14 of the part processing assembly 10, and more particularly an idler assembly 12 of the belt-and-pulley system 14.

By way of background, the belt-and-pulley system 14 of a part processing assembly 10 includes, for example, one or more spindle assemblies 62 and one or more idler assemblies 12. A spindle assembly 62 is configured to support a part 22 being processed in the processing assembly 10. During use of the processing assembly 10, a part 22 can be fixed on a support 24 of the spindle assembly 62, as illustrated in FIG. 1. The part 22 may be of varying forms, and an example of such a part 22 might include an automotive gear component. While not described herein, reference is made to the incorporated patent, U.S. Pat. No. 5,272,897, with regard to the operation of the overall part-processing apparatus. In general, the belt-and-pulley system 14 of the part processing assembly 10 is configured to permit rotation of the part 22 during processing by rotation of the spindle assembly 62.

The spindle assembly 62 receives a part 22 mounted on the support 24, which is then processed in an automated manner. The processing may include various steps, including for example automated fixturing of a part hold-down assembly 20 against the part 22, rotation of the part 22 relative to one or more processing nozzles 50, and movement of the part 22 on a turntable 16 of the processing assembly 10 through a processing path. For example, one type of process used with such processing assembly 10 may be peening. As shown in FIGS. 1 and 2, a series of peening nozzles 50 may be aimed or otherwise directed in a predetermined direction towards the parts 22 carried on the support 24. The peening nozzles 50 are configured to emit or spray peening material 26, which can be comprised of one type or a combination of various types and sizes of suitable material to alter the surface of the part 22 being processed. While the process itself is not the subject of the present application, the operation of the process is described to explain the introduction of peening material 26 in the processing assembly 10, including near one or more idler assemblies 12.

The belt-and-pulley system 14 is configured to cause efficient and controlled rotation of the part 22 during processing, and as the part 22 travels along the processing path on the turntable 16. As illustrated in FIG. 2, the turntable 16 permits individual spindle assemblies 62 to rotate along a processing path to be processed at various points along the path. In addition to the turntable 16 being rotatable to carry the part 22 around the processing assembly 10, the spindle assembly 62 is configured to rotate the support 24 relative to the turntable 16 in order to rotate the part 22 with respect to an individual nozzle 50, as illustrated in FIG. 1. A portion of the spindle assembly 62 is fixedly attached to a bottom surface 18 of the turntable 16 to permit such independent rotation. The support 24 holding the part 22 is configured to be rotated to permit efficient and effective peening on an entire outer surface 22a of the part 22. In illustrative embodiments, the outer surface 22a may be convex in nature. In order to rotate the support 24 and the part 22, the spindle assembly 62 is configured to be coupled to the support 24. The belt-and-pulley system 14 is used to drive rotational movement R of the spindle assembly 62, support 24, and part 22, as illustrated in FIG. 2.

In illustrative embodiments, and as seen in FIGS. 1 and 2, the belt-and-pulley system 14 is configured to include one or more spindle assemblies 62, one or more idler assemblies 12, and a drive belt 38. Both the spindle assemblies 62 and the idler assemblies 12 are configured to be brought into contact with the drive belt 38 to rotate the spindle assemblies 62 and the idler assemblies 12, as illustrated. The drive belt 38 may be driven along a belt path P by an appropriate motor, not shown, so that the spindle assemblies 62 and the idler assemblies 12 rotate according to the speed of the drive belt 38. As the spindle assemblies 62 rotate, the part(s) 22 coupled to the spindle assemblies 62 also rotate conjointly. Thus, the spindle assemblies 62 and idler assemblies 12 rotate in response to movement M of the belt 38 in order to rotate the part(s) 22 being processed.

In illustrative embodiments, and as seen in FIG. 2, the spindle assemblies 62 and idler assemblies 12 may be located at different places along the belt path P of the belt-and-pulley system 14 in order to effect desired rotational movement R and a desired minimum number of spindle assemblies 62. As discussed more fully below, an idler assembly 12 may be located beyond an outside edge 17 of the turntable 16 in order to maximize and affect efficient use of the spindle assemblies 62. Moreover, in illustrative embodiments, the drive belt 38 of the belt-and-pulley system 14 may be a single, continuous loop that engages with the idler assemblies 12 and spindle assemblies 62 along the belt path P of the belt-and-pulley system 14.

The spindle assemblies 62 are configured to cause rotational movement R of support 24 and thereby cause rotational movement R of the part 22 on the support 24. The spindle assemblies 62 assist in rotating the support 24 to ensure proper and thorough peening of the parts 22. In illustrative embodiments, a single spindle assembly 62 may be configured to include a circular pulley 52, a spindle shaft 40, and a base 28 to connect the spindle assembly 62 to the bottom surface 18 of the turntable 16. The circular pulley 52 is fixedly connected to the spindle shaft 40 to permit rotation of the spindle shaft 40 about an axis of rotation 36, as illustrated in FIG. 1. The shaft 40 is fixedly coupled to the support 24 holding the part 22. The base 28 may be configured with a supporting member 60 that supports and maintains the circular pulley 52 while allowing the circular pulley 52 to rotate relative to the base 28. The circular pulley 52 of the spindle assembly 62 may include a top guide 30 and a bottom guide 32. A belt track 34 may be formed between the top guide 30 and the bottom guide 32, as illustrated, for example, in FIG. 1. The circular pulley 52 is configured to rotate about the axis of rotation 36 when the belt 38 engages with the belt track 34. Specifically, movement M of the belt 38 of the belt-and pulley system 14 translates rotational movement R to the circular pulley 52 to permit rotational movement R of the shaft 40, and thereby rotational movement R of the support 24 and part 22.

Figure 3:
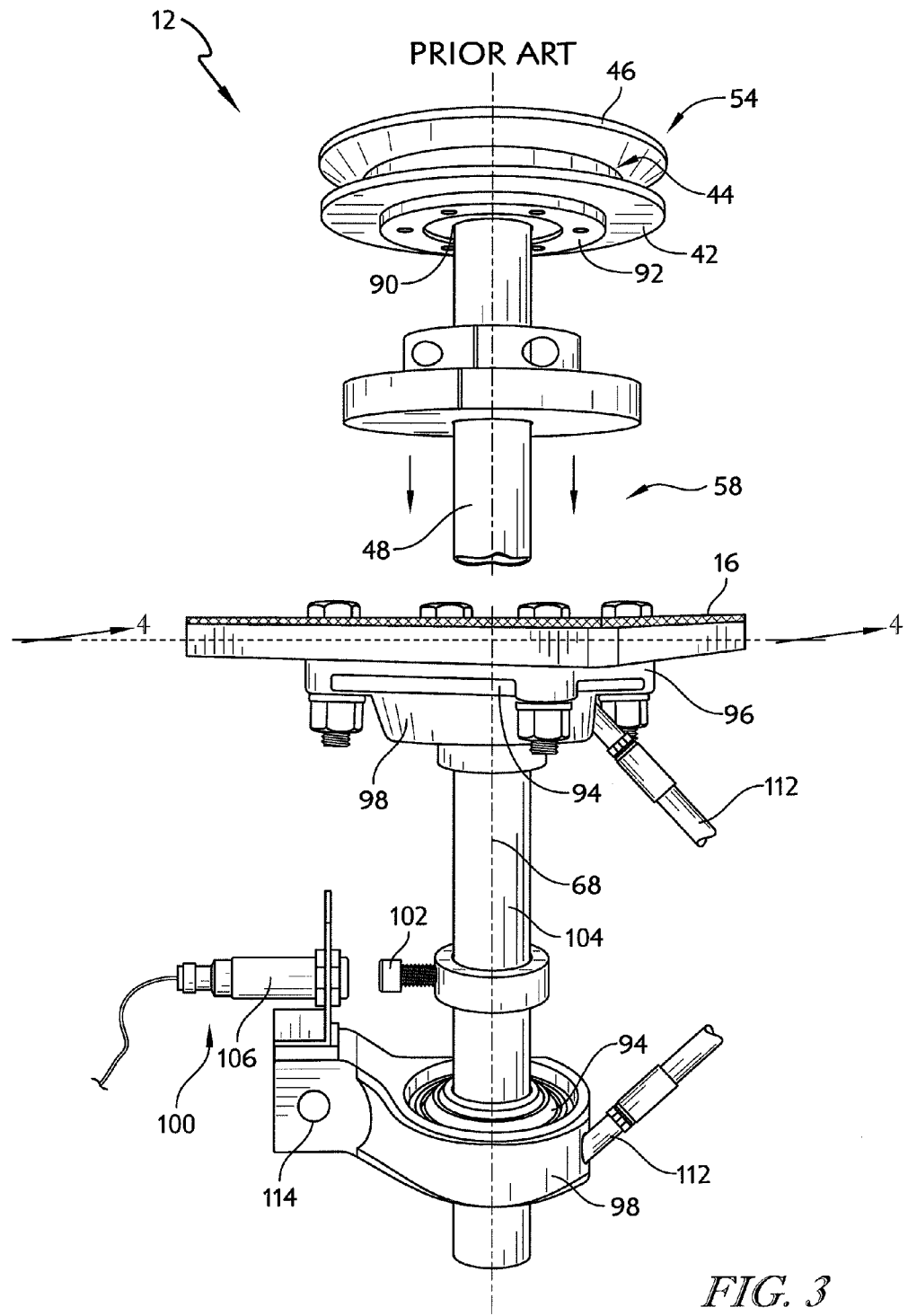
FIG. 3 is a perspective view of a prior-art idler assembly along a belt track of a part processing apparatus.

In illustrative embodiments, an idler assembly 12 may be configured to include a circular pulley 54 and a base 58 connecting the circular pulley 54 to the bottom surface 18 of the turntable 16. As with the spindle assemblies 62, the idler assemblies 12 are also configured to rotate with rotational movement R of the circular pulley 54. As illustrated in FIG. 3, the base 58 may be configured with a supporting member 48 that supports and maintains the circular pulley 54. The circular pulley 54 may include a top guide 46 and a bottom guide 42. A belt track 44 may be formed between the top guide 46 and the bottom guide 42, as illustrated, for example, in FIGS. 3 and 5. The circular pulley 54 is configured to rotate along an axis of rotation 68 when the drive belt 38 engages with the belt track 44. Specifically, movement M of the belt 38 translates rotational movement R to the circular pulley 54 to permit rotational movement R of the idler assembly 12. As illustrated in FIGS. 1 and 2, both the idler assemblies 12 and the spindle assemblies 62 may be configured to constantly engage with the drive belt 38. In alternative embodiments, the spindle assemblies 62 may be configured to engage and disengage with the drive belt 38, the idler assemblies 12 may be configured to constantly engage with the drive belt 38. The idler assemblies 12 may continuously rotate with rotational movement R as long as the drive belt 38 is being driven by the motor.

During part processing, peening material 26 or other types of material are sprayed from peening nozzles 50. Such peening material 26 may unintentionally engage with the idler assemblies 12 and create clogging or jamming issues as the idler assemblies 12 continuously rotate. For example, peening material 26 may be sprayed such that it would accumulate around the assembly and become lodged within a rotational aperture that permits rotation of the circular pulley 54 about rotation axis 68, thereby possibly causing interference with rotation of the circular pulley 54.

Figure 4:
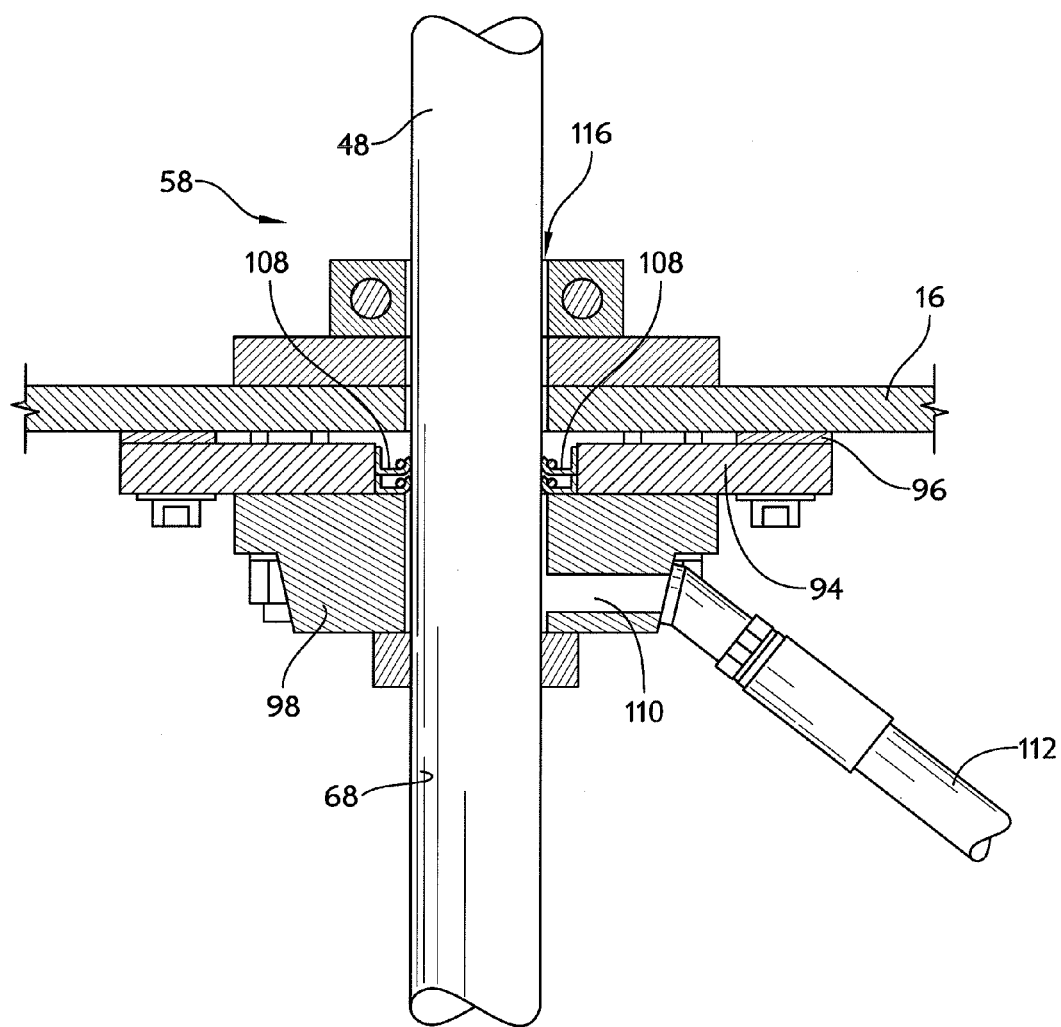
FIG. 4 is a cross-sectional view of the prior-art idler assembly of FIG. 3.

Prior-art idler assemblies may be configured in such a way that clogging occurs. For instance, as illustrated in FIGS. 3 and 4, the supporting member 48, which is secured to the circular pulley 54, may be configured to rotate in a rotational aperture 116 in the turntable 16. The supporting member 48 may further extend through a bearing housing 94 coupled to a turntable mount 96 that is coupled to the turntable 16, the supporting member 48 configured to rotate via bearings 108 in the bearing housing 94. However, when peening material 26 is sprayed near the idler assemblies 12, peening material 26 may intentionally be introduced into the bearing housing 94 via, for example, the rotational aperture 116. Such peening material 26 may build up within the bearing housing 94 and interfere with operation of the bearings 108, and ultimately, the rotation of the supporting member 48. Such clogging occurs because of the location where rotational movement R occurs in the idler assembly 12, namely in the bearing housing 94 located below the rotational aperture 116. Inclusion of the bearing housing 94 outside of the circular pulley 54 and below the turntable 16 may traditionally provide a cost advantage as opposed to inclusion of the bearing housing in a more intricate circular pulley 54, but does not address this clogging issue.

In order to ensure a prior-art idler assembly 12 continues to efficiently and effectively rotate, prior-art idler assemblies 12 may include mechanisms to enhance and improve the performance of the bearings 108. For instance, as illustrated in FIGS. 3 and 43, an idler assembly 12 may further include a lubricant housing 98 that is in fluid connection with the bearings 108. A lubricant channel 110 may extend through the lubricant housing 98 from a lubricant input 112 to the bearings 108 to permit grease or other lubricants to engage with the bearings 108. Such lubricants positively pressurized into the bearing 108 permit the bearings 108 to work properly so to reduce the effect of peening material 26 or other debris interfering with the operation of the bearings 108.

Prior art idler assemblies 12 may also include mechanism to monitor or sense whether rotation of an idler assembly 12 has stopped, as illustrated, for example in FIGS. 3 and 4. Specifically, an idler assembly 12 may include a sensor-and-pin system 100. The sensor-and-pin system 100 may include a pin 102 fixedly coupled to a rotating shaft 104 that is fixedly connected to the circular pulley 54. A monitoring sensor 106 may be secured to a fixed location in the processing assembly 10 via a fixed connection 114, the monitoring sensor 106 being configured to sense whether the pin 102 is rotating at an appropriate speed (e.g. revolutions per minute) to determine whether the circular pulley 54 is continuing to rotate appropriately. Such monitoring is an expensive and intricate system, however. Moreover, such a monitoring system 100 does nothing to prevent interruption of rotation, and therefore the idler assembly 12 may be required to be decommissioned in order to clear and clean the peening material 26 that is clogging the idler assembly 12. Substantial downtime and resources may be involved in resolving a jammed or clogged idler assembly 12.

Figure 5:
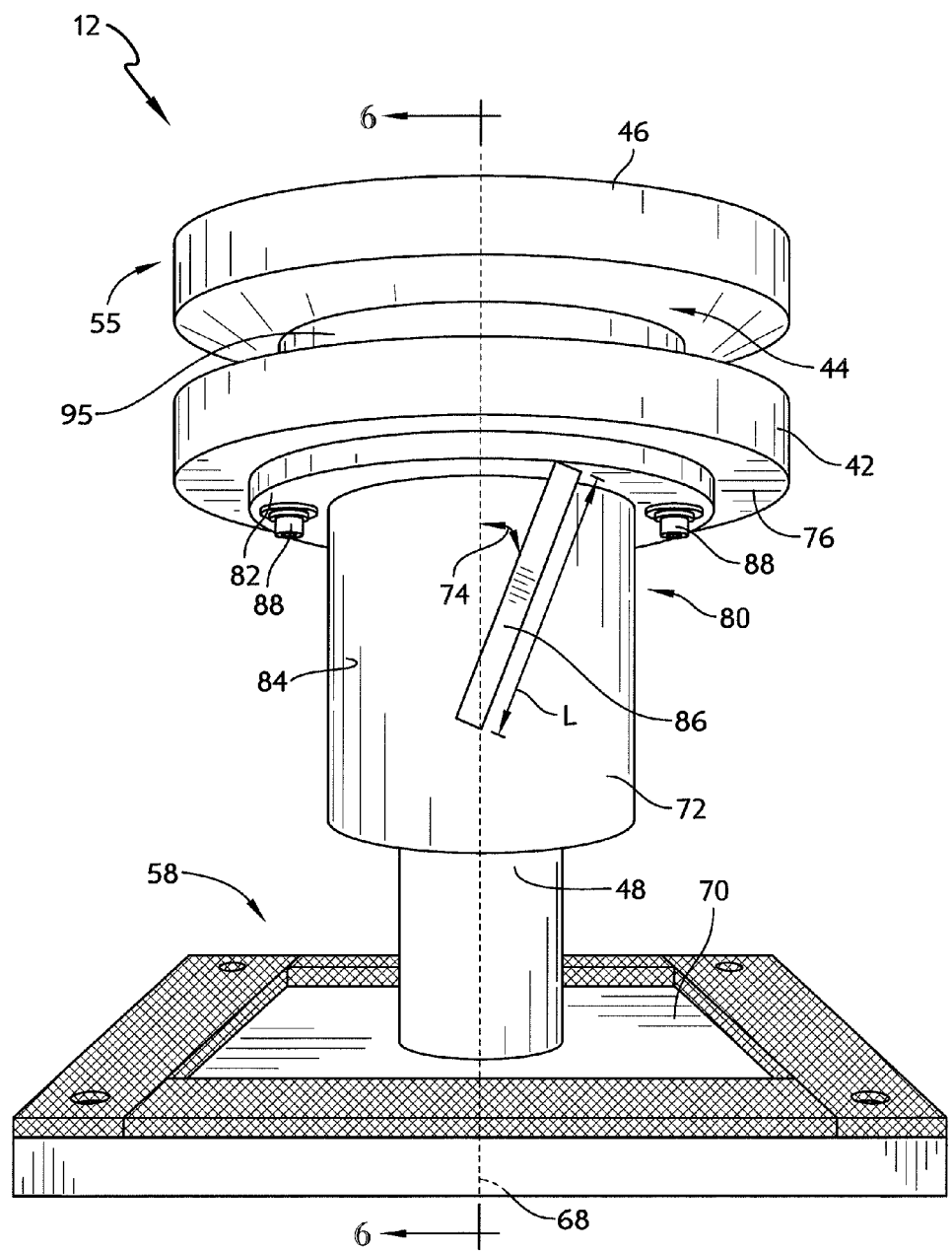
FIG. 5 is a side-perspective view of an illustrative embodiment of an idler assembly of the present disclosure.
Figure 6:
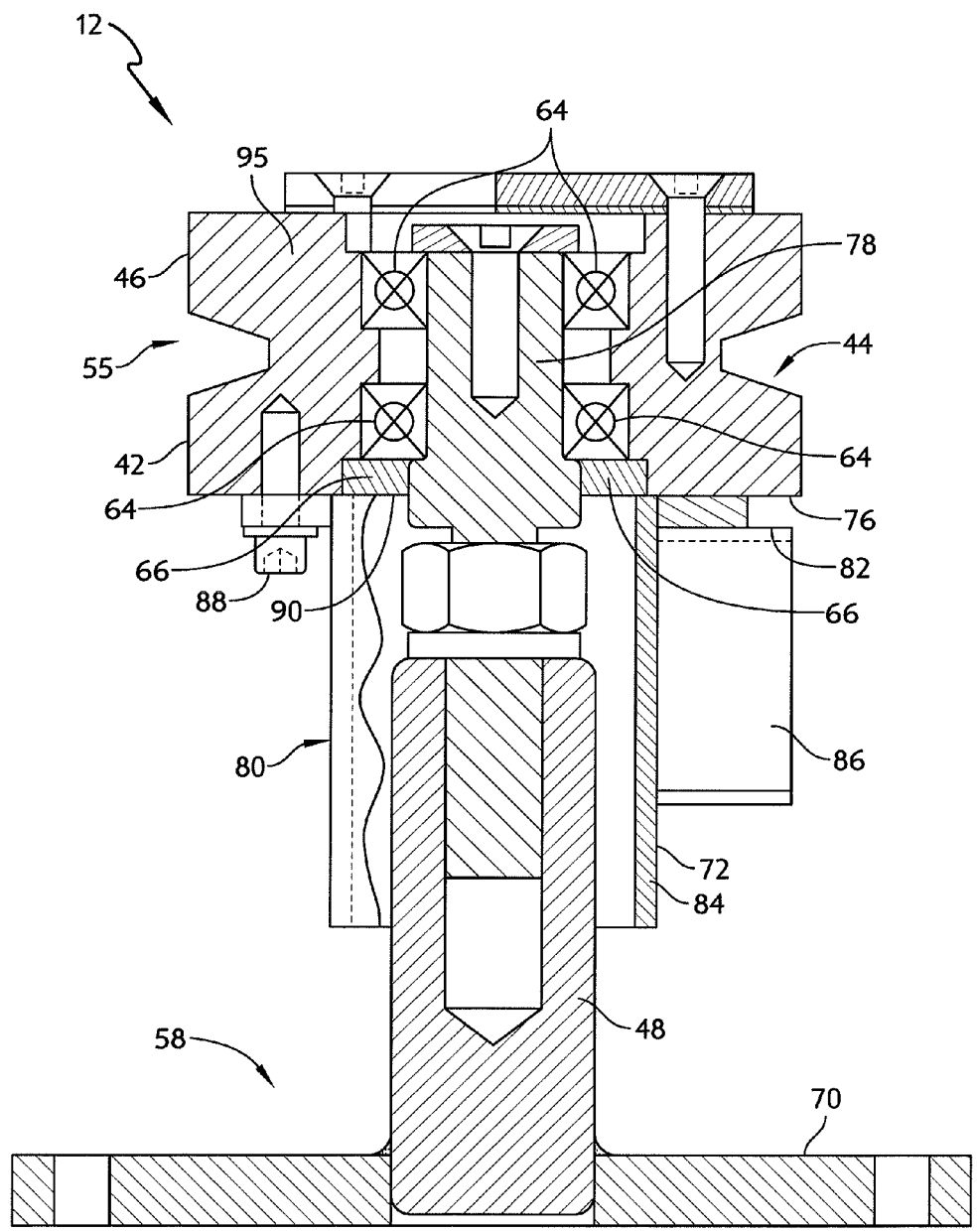
FIG. 6 is a cross-sectional view of the idler assembly of FIG. 5.
Figure 7:
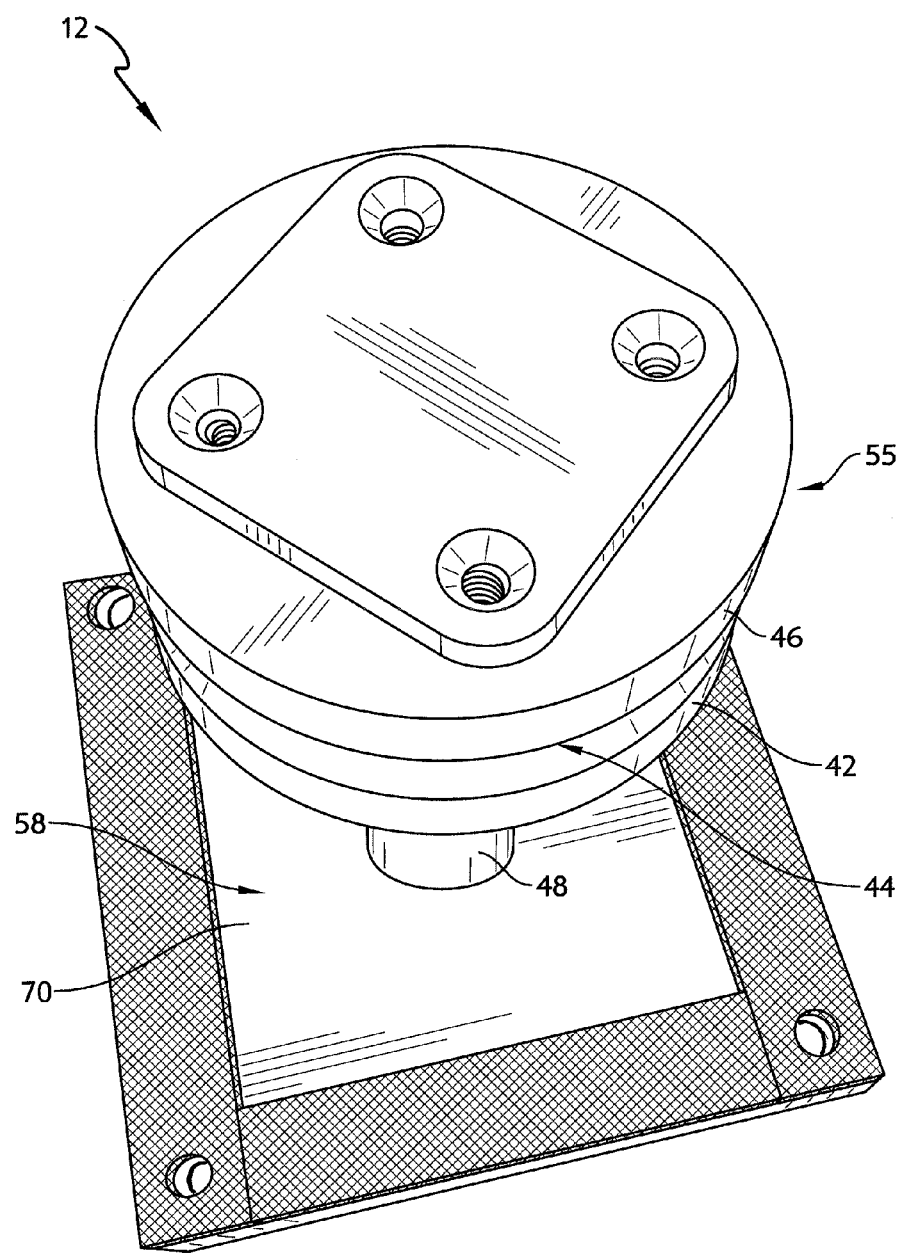
FIG. 7 is a top-perspective view of the idler assembly of FIG. 5.
Figure 10:
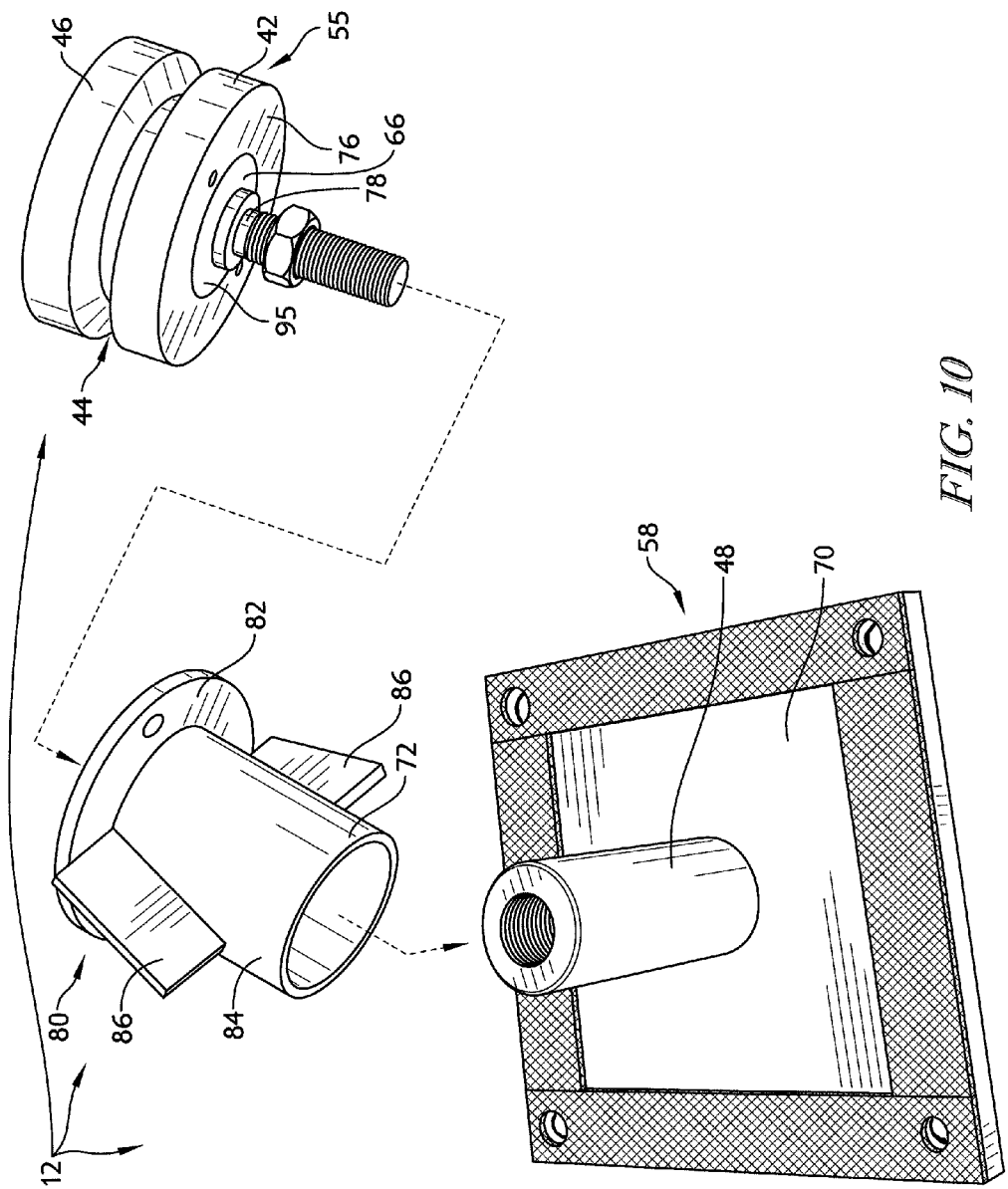
FIG. 10 is a disassembled view of the idler assembly of FIG. 5, showing the idler assembly includes a pulley head, a vane sweep and a connection base.

As illustrated in FIGS. 5 and 6, the present disclosure is directed to overcoming the issues related to the prior-art systems. Specifically, the present disclosure is directed to an idler assembly 12, the idler assembly 12 including a circular pulley 55, a base 58, and a vane sweep 80, as illustrated in FIGS. 5, 6 and 10. The circular pulley 55 is similar to the circular pulley 54 as discussed above, except that a bearing housing 95 is now included within the circular pulley 55. Bearings 64 permit rotational movement of the circular pulley 55 about an axis shaft 78 that extends through a rotational aperture 90 of the circular pulley 55 and is fixedly coupled to the supporting member 48. In this way, the circular pulley 55 is not fixedly connected to the supporting member 48, but is rotatably fixed to the supporting member 48. A flexible seal 66 is located in the rotational aperture 90 that permits rotation of the axis shaft but still encloses the axis shaft 78 from the surrounding environment. The seal 66 surrounds the axis shaft 78 and substantially encloses the bearing housing 95 along the bottom guide 42 of the circular pulley 55.

The base 58 may be configured to include a platform 70 and an upwardly extending supporting member 48 about which the circular pulley 55 rotates. The platform 70 of the base 58 may be configured to be secured to the bottom surface 18 of the turntable 16. The vane sweep 80 is further configured to rotate with respect to the base 58 along with rotation of the circular pulley 55. The vane sweep 80 is configured both to block or prevent peening material 26 from entering the rotational aperture 90 and to remove or sweep away any peening material 26 that may build up along the base 58 toward the circular pulley 55. For instance, as illustrated in FIGS. 5 and 6, the vane sweep 80 is fixedly connected to a bottom surface 76 of the bottom guide 42 and extends toward the base 58. The vane sweep 80 is connected to the bottom surface 76 such that it extends past and encompasses the seal 66 and the rotational aperture 90 of the circular pulley 55, blocking access to the rotational aperture 90 from outside particles. In this way, the vane sweep 80 effectively prevents any peening material 26 or other debris from entering the rotational aperture 90 or interfering with the bearings 64.

The vane sweep 80 may be configured of multiple designs. In illustrated embodiments, and as illustrated in FIGS. 5, 6, 8 and 9, the vane sweep 80 may include an annular top ledge 82, an annular sheath 84, and one or more outwardly extending fins 86. The top ledge 82 may be configured to be fixedly attached to the bottom surface 76 of the bottom guide 42 of the circular pulley 54. Various forms of connection, including but not limited to bolts or rivets 88, may be used to attach the top ledge 82 to the bottom surface 76. The annular sheath 84 is configured to extend from the top ledge 82 in a direction toward the base 58 of the idler assembly 12. In illustrative embodiments, the sheath 84 may be circumferentially smaller than the top ledge 82. In illustrative embodiments, the sheath 84 may extend for 2 inches or more. Further in illustrative embodiments, the sheath 84 may extend a substantial distance, such as a distance that is equal to or more than halfway between the top ledge 82 and the platform 70 of the base 58. The sheath 84 is configured to prevent or block peening material 26 from being sprayed near the vicinity of the aperture 90 of the circular pulley 54. Alternative designs of the sheath 84 that block or prevent peening material 26 from entering the aperture 90 are also envisioned.

Figure 8:
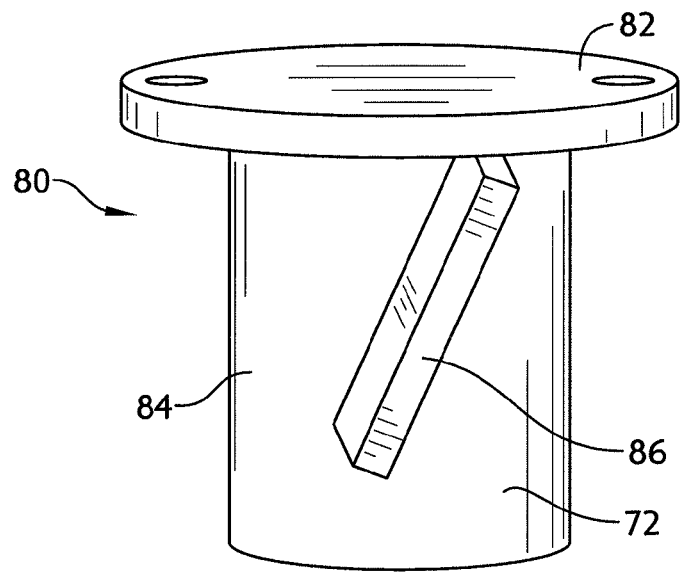
FIG. 8 is a side-perspective view of a vane sweep of the idler assembly of FIG. 5.
Figure 9:
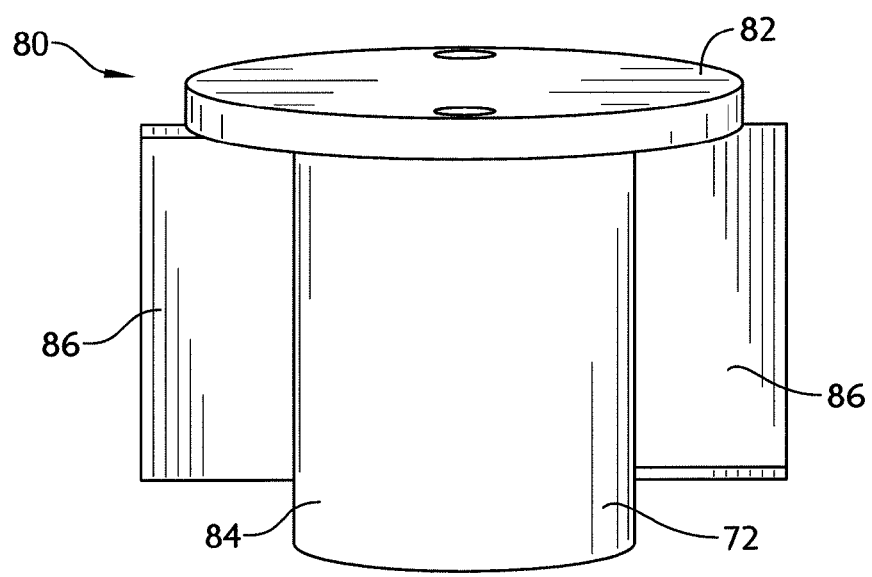
FIG. 9 is a front-perspective view of the vane sweep of FIG. 8.

The one or more outwardly extending fins 86 of the vane sweep 80 may be configured with various designs. In illustrative embodiments, the fin 86 may be coupled to the sheath 84 along the circumferential outside surface 72 of the sheath 84 and extend outward therefrom. In exemplary embodiments, the fin 86 may be coupled to the sheath 84 at an angle 74 from the axis of rotation 68, as illustrated in FIG. 5, or the fin 86 may be substantially parallel to the axis of rotation 68. Other angles of connecting the fin 86 to the sheath 84 are also envisioned. The shape of the fin 86 may also include various designs. As illustrated in FIG. 8, the fin 86 may be shaped to be substantially straight. The fin 86 may further be configured to have a wave or curved form along the length L of the fin 86. Other embodiments of the fin 86 shape are also envisioned.

By operation/rotation of the present idler assembly 12, the vane sweep 80 will rotate with rotation of the circular pulley 55 about the supporting member 48. As the vane sweep 80 rotates, the one or more fins 86 will rotate about the axis of rotation 68. Rotation of the fins 86 will sweep or brush away peening material 26 that has built up near the idler assembly 12 in order to prevent such peening material 26 from entering the rotational aperture 90 of the circular pulley 55. Thus, the vane sweep 80 prevents peening material 26 from unintentionally interfering with rotational operation of the idler assembly 12.

The idler assembly 12 may be located in particular relationship to the spindle assemblies 62 along the belt path P to promote an optimal number of spindle assemblies 12, such as two or more, that can engage with the drive belt 38 simultaneously, thereby providing efficiencies in processing. For example, as illustrated in FIGS. 1 and 2, the idler assemblies 12 may be located outside of the circumference (defined by the outside edge 17) of the turntable 16, while the spindle assemblies 62 may be located within the circumference of the turntable 16 to permit additional space for spindle assemblies 62 within the circumference of the turntable 16. In illustrative embodiments, there may be two or more idler assemblies 12 located at substantially opposite sides of the turntable 16, as illustrated in FIG. 2. In illustrative embodiments, the drive belt 38 may be threaded through the belt track 44 of the idler assembly 12 in such a manner as to promote the drive belt 38 into engagement with multiple spindle assemblies 62 as the spindle assemblies 62 rotate about the turntable 16. In illustrative embodiments, the idler assemblies 12 may also be configured to have rotational movement R that is opposite of rotational movement R of a spindle assembly 62. For instance, a spindle assembly 62 may rotate clockwise and an idler assembly 12 may rotate counter-clockwise along the same belt path P, as illustrated in FIG. 2.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure.

The invention claimed is:

1. A machine for processing parts comprising:
   a turntable, said turntable being rotatable between a load and unload position and a processing position and including an apparatus to retain a part as the turntable rotates;
   a belt-and-pulley system, the belt-and-pulley system configured to permit rotation of the part with respect to the turntable, the belt-and-pulley system including a spindle assembly, an idler assembly, and a belt traveling along a belt path and engaging with the spindle assembly and idler assembly, wherein the spindle assembly is configured to retain the part, and wherein the idler assembly is configured to retain the belt;
   wherein the idler assembly is configured to include a circular pulley to engage with the belt and a vane sweep, the circular pulley including a bearing mechanism to permit rotational movement of the circular pulley about a rotational aperture of the idler assembly, and the vane sweep fixedly connected to a base of the circular pulley to at least shield the rotational aperture from debris.

2. The machine for processing parts of claim 1, wherein the vane sweep includes an annular sheath extending below the circular pulley and configured to rotate with rotation of the circular pulley.

3. The machine for processing parts of claim 2, wherein the annular sheath extends at least half way between the base of the circular pulley and a base onto which the idler assembly is attached.

4. The machine for processing parts of claim 2, wherein the vane sweep includes one or more fins extending circumferentially outward from the annular sheath.

5. The machine for processing parts of claim 4, wherein circular pulley rotates about an axis of rotation and the one or more fins is angled with respect to the axis of rotation.

6. The machine for processing parts of claim 4, wherein the fins are substantially straight.

7. The machine for processing parts of claim 2, wherein the vane sweep includes an annular top ledge that extends below the rotational aperture and above the annular sheath.

8. The machine for processing parts of claim 7, wherein the annular top ledge encloses the rotational aperture from the surrounding environment.

9. The machine for process part of claim 7, wherein the vane sweep includes one or more fins extending circumferentially outward from the annular sheath and the one or more fins extend outside the circumference of the annular top ledge.

10. An idler assembly for use with a part processing apparatus, the idler assembly comprising:
    a circular pulley, the circular pulley including a top guide, a bottom guide spaced from the top guide, and a belt track extending between the top guide and bottom guide;
    a bearing assembly substantially enclosed within the circular pulley and permitting rotation of the circular pulley about an axis shaft of a rotational aperture of the circular pulley; and
    a vane sweep fixedly attached to the bottom guide of the circular pulley, the vane sweep rotating about the axis shaft of the circular pulley when the circular pulley rotates.

11. The idler assembly of claim 10, wherein the vane sweep include includes an annular sheath extending below the circular pulley and surrounding the axis shaft.

12. The idler assembly of claim 11, wherein the annular sheath extends at least half way between the bottom guide of the circular pulley and a base onto which the axis shaft is attached.

13. The idler assembly of claim 11, wherein the vane sweep includes one or more fins extending circumferentially outward from the annular sheath.

14. The idler assembly of claim 13, wherein the circular pulley rotates about an axis of rotation and the one or more fins is angled with respect to the axis of rotation.

15. The idler assembly of claim 13, wherein the fins are substantially straight.

16. The idler assembly of claim 11, wherein the vane sweep includes an annular top ledge that extends below the rotational aperture and above the annular sheath.

17. The idler assembly of claim 16, wherein the annular top ledge encloses the rotational aperture from the surrounding environment.

18. The idler assembly of claim 16, wherein the vane sweep includes one or more fins extending circumferentially outward from the annular sheath and the one or more fins extend outside the circumference of the annular top ledge.

19. A machine for processing parts comprising:
    a turntable, said turntable being rotatable between a load and unload position and a processing position and including an apparatus to retain a part as the turntable rotates;
    a belt-and-pulley system, the belt-and-pulley system configured to permit rotation of the part with respect to the turntable, the belt-and-pulley system including two or more spindle assemblies, a first idler assembly, and a belt traveling along a belt path and engaging with the two or more spindle assemblies and the first idler assembly, wherein the spindle assemblies are configured to retain the part, and wherein the first idler assembly is configured to retain the belt;
    wherein the first idler assembly is configured to permit the two or more spindle assemblies to rotate simultaneously.

20. The machine for processing parts of claim 19, wherein the idler assembly is located outside of the circumference of the turntable and the two or more spindle assemblies are located inside the circumference of the turntable.

21. The machine for processing parts of claim 20, wherein the belt-and-pulley system includes a second idler assembly, and wherein the first idler assembly and second idler assembly may be located substantially opposite from each other across the circumference of the turntable.

22. The machine for processing parts of claim 20, wherein the first idler assembly rotates with a first rotation movement and the two or more spindle assemblies rotate with a second rotation movement, and wherein the first rotation movement is opposite of the second rotation movement.

23. The machine for processing parts of claim 22, wherein the first rotational movement is counter-clockwise and the second rotational movement is clockwise.

* * * * *